(No Model.)
W. J. & A. HARNOIS.
ANIMAL POKE.
No. 532,372.          Patented Jan. 8, 1895.
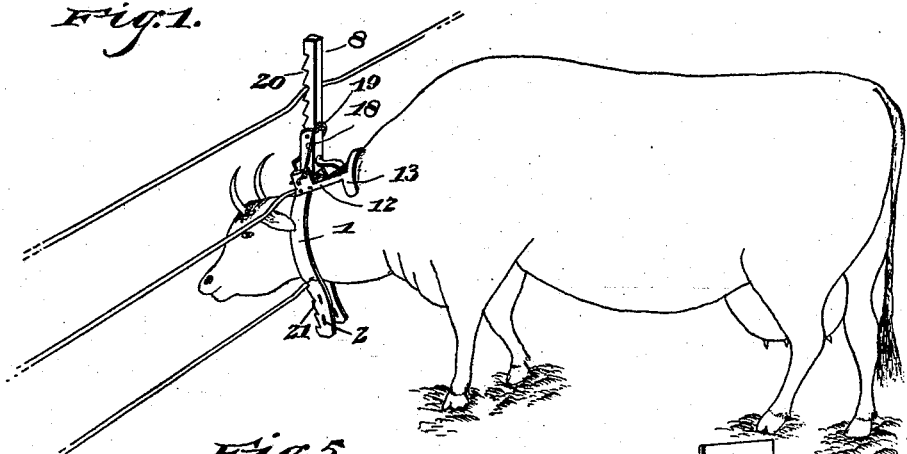
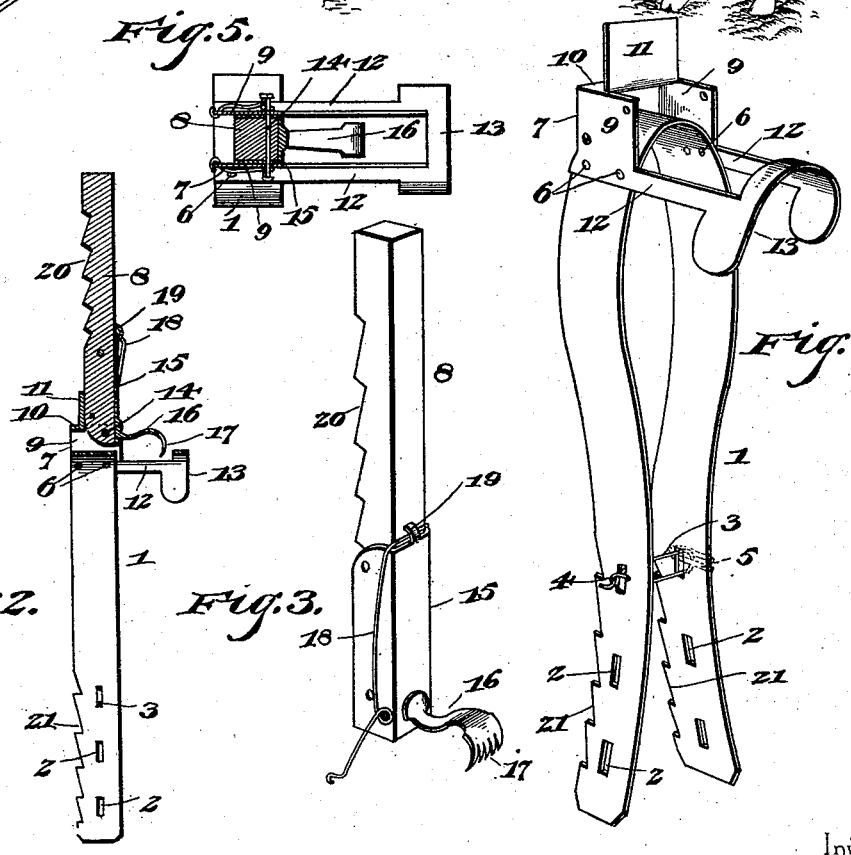
Witnesses
B. S. Ober
J. B. Owens
Inventors:
William J. Harnois,
Adelbert Harnois,
By their Attorneys.
C. A. Snow & Co.

UNITED STATES PATENT OFFICE.

WILLIAM J. HARNOIS AND ADELBERT HARNOIS, OF CHEDI, SOUTH DAKOTA.

ANIMAL-POKE.

SPECIFICATION forming part of Letters Patent No. 532,372, dated January 8, 1895.

Application filed May 21, 1894. Serial No. 512,003. (No model.)

*To all whom it may concern:*

Be it known that we, WILLIAM J. HARNOIS and ADELBERT HARNOIS, citizens of the United States, residing at Chedi, in the county of Brown and State of South Dakota, have invented a new and useful Animal-Poke, of which the following is a specification.

Our invention relates to an improvement in that class of animal pokes wherein a swinging arm is employed and adapted to actuate, when engaged, a spur for piercing the animal's neck or shoulders; and it consists of certain peculiar features of the construction of the spur and attendant parts, whereby the animal is more effectually pierced and whereby the spur is kept from engagement with the animal except during his attempts to pass a fence or other barrier.

The invention also consists in features of construction and combinations of parts, which are present in various parts of the device, all of which will receive detail description hereinafter and be finally embodied in the claim.

In the drawings—Figure 1 represents a perspective view of an animal poke constructed after the manner of our invention and showing it applied; Fig. 2, a longitudinal and vertical section of the same; Fig. 3, an enlarged perspective view of the spur and its adjacent and dependent parts; Fig. 4, a similar view of the yoke with the spur lever removed; Fig. 5, a horizontal section taken just above the spur and looking downwardly thereon.

The reference numeral 1, indicates the yoke portion of our device, and this is formed preferably of a strip of strap or hoop iron, bent at its middle and having its ends extending downwardly where they are provided with the horizontally aligned and vertically elongated slots 2. The slots 2 are preferably three for each end of the yoke and are provided for the reception of the link 3. This device, link 3, is formed by preference, of a section of wire bent so that one end will be formed with the detents 4, while the remaining end will be capable of receiving the pin 5, by which the link is held in place. By these means the yoke may be secured in place on the neck of the animal and, with the help of slots 2, adjusted to the size of the neck.

Rigidly secured to the bent upper end of the yoke 1, and by means of the rivets 6, is the frame 7, which operates to furnish a fulcrum for the spur lever 8, as will more fully appear hereinafter. This frame may be formed of sheet or malleable iron and may be welded or riveted as desired. It consists of two vertical and parallel arms 9, provided at their upper ends with the horizontal brace 10, which extends from one to another and is provided with the vertical lip 11.

Extending rearwardly from the base of the arms 9, are the arms or rods 12, which are two in number and are provided at their outer extremities with the curved or semi-circular plate 13. This plate 13, is adapted to bear on the shoulders of the animal, as shown in Fig. 1, and to operate to prevent the yoke 1 from swinging forwardly on the neck of the animal. Fulcrumed on the pin 14, of the arms 9, is the spur lever 8, which is formed preferably of hard wood and is of a length not quite equal to that of the yoke 1.

Bolted to the lower end of the lever 8, is the metallic plate 15, which embraces its sides and back and has formed integral therewith or rigidly secured thereto the spur arm 16. This arm 16, extends rearwardly and downwardly and directly over and between the space between the arms 12, and has its end formed into the teeth 17, which form the hereinbefore referred to spur. These teeth 17, or the spur 17, extend downwardly, and are adapted to pass between the arms 12, and in front of plate 13, in the operation of piercing the animal.

The lever 8, is given a tendency forwardly or to a vertical position by means of the spring 18, which is secured at its ends to the base of the arms 9, and proceeds upwardly and rearwardly to the pin 14, around which it passes, and from thence, upwardly to the upper end of the plate 15, to which it is secured by means of the stud 19. The purpose of the spring is to give the lever 8, a tendency forwardly and this is limited to a vertical position by means of the lip or shoulder 11.

Formed on the front face of the lever 8, are the ratchet teeth 20, which are provided with downwardly projecting shoulders, and these are adapted to furnish a means for engaging the fence or other barrier, as the animal engages the same. The lower ends of the yoke 1, are also provided with the teeth 21, which are similar to the teeth 20, and are provided for the same purpose.

In the use of our invention the yoke is fastened on the animal's neck, with the lever 8, upwardly and the plate 13, bearing against the shoulders of the animal, whereby the device is steadied. Now, should the animal attempt to pass through or over a fence, wall, or analogous device, the notches or teeth 20 of the lever 8, will engage and bind therewith and cause the arm 16 to move downwardly, which will throw the spur 17 into engagement with the animal's shoulders. This engagement will be attended by sharp pain, and will cause the animal to retract his movements. If the animal attempts to pass over the fence the teeth 21, will engage with the top wire thereof, and thereby stop the animal.

It will be seen that an animal having our improvements applied will be free to move about, and that his movements will be unrestrained until he attempts to pass a fence, when he will be restrained, as explained.

Having thus described our invention, what we claim is—

An animal poke consisting of a yoke adapted to be secured to the animal's neck, two arms arising vertically therefrom, and having a transverse lip at their upper ends, a lever pivoted between the arms, a spring for giving the lever a tendency to bear against the lip whereby the lever is held in place, two rearwardly extending rods secured to the yoke and having a plate at their ends, said plate being adapted to engage the neck of the animal and hold the poke secure, and a spur secured to the lever and adapted to engage the animal's neck, when the lever is pushed back, substantially as described.

In testimony that we claim the foregoing as our own we have hereto affixed our signatures in the presence of two witnesses.

WILLIAM J. HARNOIS.
ADELBERT HARNOIS.

Witnesses:
C. K. NEFF,
M. R. SMITH.